(12) United States Patent
Bush et al.

(10) Patent No.: US 9,106,886 B2
(45) Date of Patent: Aug. 11, 2015

(54) TAGGING DIGITAL TELEVISION SIGNALS

(75) Inventors: Terry W. Bush, Greenwood, IN (US); Gregg Stephen Rodgers, Noblesville, IN (US); Brett W. Emsley, Zionsville, IN (US)

(73) Assignee: Trilithic, Inc., Indianapolis, IN (US)

( * ) Notice: Subject to any disclaimer, the term of this patent is extended or adjusted under 35 U.S.C. 154(b) by 303 days.

(21) Appl. No.: 13/376,903

(22) PCT Filed: Jun. 4, 2010

(86) PCT No.: PCT/US2010/037458
§ 371 (c)(1),
(2), (4) Date: Dec. 8, 2011

(87) PCT Pub. No.: WO2010/144326
PCT Pub. Date: Dec. 16, 2010

(65) Prior Publication Data
US 2012/0086865 A1    Apr. 12, 2012

Related U.S. Application Data

(60) Provisional application No. 61/185,677, filed on Jun. 10, 2009.

(51) Int. Cl.
*H04N 7/173* (2011.01)
*H04N 17/00* (2006.01)
(52) U.S. Cl.
CPC .................................... *H04N 17/00* (2013.01)

(58) Field of Classification Search
CPC .. H03C 3/005; H04L 27/2032; H04L 27/362; H04L 27/38; H04N 17/00; H04H 20/12; H04H 20/78; G06K 9/0055; G10L 25/48
USPC ............... 725/135, 107; 348/180, 192–194, 6
See application file for complete search history.

(56) References Cited

U.S. PATENT DOCUMENTS

| 5,608,428 | A | * | 3/1997 | Bush | 725/149 |
| 6,018,358 | A | * | 1/2000 | Bush | 725/125 |
| 6,313,874 | B1 | | 11/2001 | Bowyer et al. | |
| 6,804,826 | B1 | | 10/2004 | Bush et al. | |
| 2002/0019983 | A1 | | 2/2002 | Emsley et al. | |
| 2002/0060735 | A1 | | 5/2002 | Bowyer et al. | |
| 2002/0095686 | A1 | * | 7/2002 | Shi et al. | 725/107 |
| 2007/0129952 | A1 | | 6/2007 | Kenyon et al. | |

OTHER PUBLICATIONS

PCT International Search Report/Written Opinion for PCT/US2010/037458, completed Aug. 9, 2010.

* cited by examiner

*Primary Examiner* — Benjamin R Bruckart
*Assistant Examiner* — Jen-Shi Huang
(74) *Attorney, Agent, or Firm* — Barnes & Thornburg LLP

(57) ABSTRACT

A method and apparatus for detecting leakage of a digital CATV channel signal from a CATV system. The digital CATV channel signal is amplitude modulated with a tag signal having a frequency in the range of about 3 Hz to about 35 Hz, and coupled to the CATV system. At a point of leakage from the CATV system, the amplitude modulated digital CATV channel signal can be detected using a leakage detector capable of recovering the tag signal.

3 Claims, 4 Drawing Sheets

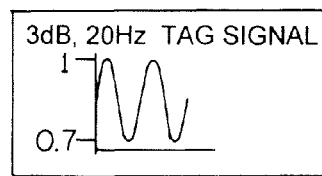
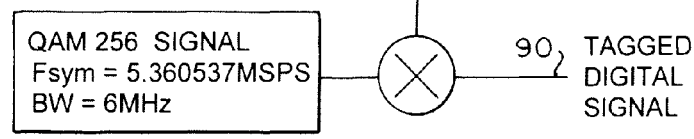
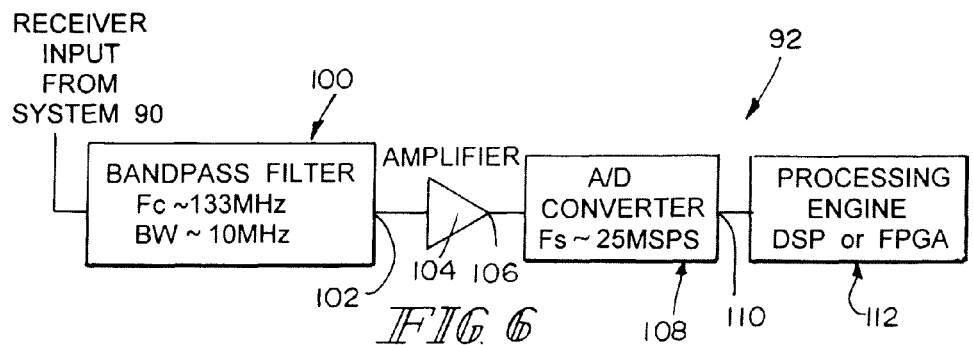
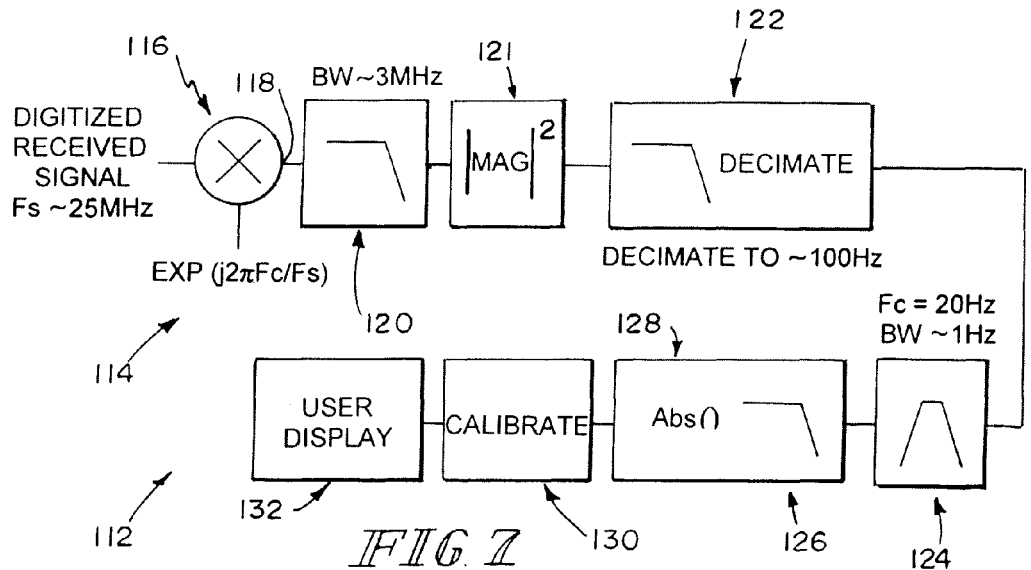

US 9,106,886 B2

TAGGING DIGITAL TELEVISION SIGNALS

CROSS-REFERENCE TO RELATED APPLICATIONS

This application is the U.S. national phase of PCT/US2010/037458 filed Jun. 4, 2010. PCT/US2010/037458 claims priority to U.S. Ser. No. 61/185,677 filed Jun. 10, 2009. The entire disclosures of U.S. Ser. No. 61/185,677 and PCT/US2010/037458 are hereby incorporated herein by reference.

BACKGROUND

The tagging of analog CATV (CATV being sometimes referred to hereinafter as cable) signals for leakage detection purposes is known. There are, for example, the systems illustrated and described in U.S. Pat. Nos. 5,608,428; 6,018,358; and, 6,804,826, and references cited in these. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

SUMMARY

According to an aspect of the disclosure, a method for detecting leakage of a digital CATV channel signal from a CATV system comprises amplitude modulating the digital CATV channel signal with a tag signal having a frequency in the range of about 3 Hz to about 35 Hz, coupling the amplitude modulated digital CATV channel signal to the CATV system, receiving the amplitude modulated digital CATV channel signal leaking from the CATV system using a leakage detector including a first bandpass filter having a center frequency within the CATV channel signal bandwidth, amplifying the bandpass filtered signal, analog-to digital (A/D) converting the amplified signal, and processing the A/D converted signal. Processing the A/D converted signal comprises mixing the A/D converted signal with a mixing signal, lowpass filtering the mixed signal to a cutoff frequency of about half the bandwidth of the amplitude modulated digital CATV channel signal, detecting the amplitude of the lowpass filtered signal, and recovering the tag signal frequency from the detected amplitude of the lowpass filtered signal.

Illustratively, amplitude modulating the digital CATV channel signal with a tag signal having a frequency in the range of about 3 Hz to about 35 Hz comprises amplitude modulating the digital CATV channel signal with a tag signal having an amplitude in the range of > about 0 dB to ≤ about 5 dB.

Further illustratively, receiving the amplitude modulated digital CATV channel signal leaking from the CATV system using a leakage detector including a first bandpass filter having a center frequency within the CATV channel signal bandwidth comprises receiving the amplitude modulated digital CATV channel signal leaking from the CATV system using a leakage detector including a first bandpass filter having a bandwidth in the range of about 5 MHz to about 15 MHz.

Additionally illustratively, A/D converting the amplified signal comprises A/D converting the amplified signal at a sampling rate in the range of about 20 MHz to about 40 MHz.

Illustratively, processing the A/D converted signal comprises processing the A/D converted signal with a processing engine.

Further illustratively, processing the A/D converted signal comprises processing the A/D converted signal with at least one of a digital signal processor (DSP) and field-programmable gate array (FPGA).

Additionally illustratively, mixing the A/D converted signal with a mixing signal comprises mixing the A/D converted signal with a complex mixing signal.

Further illustratively, lowpass filtering the mixed signal comprises filtering the mixed signal in a filter having a cutoff frequency of about half the bandwidth of the amplitude modulated digital CATV channel signal.

Illustratively, detecting the amplitude of the lowpass filtered signal comprises summing the squares of the real part and the imaginary part of the lowpass filtered signal.

Further illustratively, recovering the tag signal frequency from the detected amplitude of the lowpass filtered signal comprises decimating the lowpass filtered signal.

Additionally illustratively, decimating the lowpass filtered signal comprises decimating the lowpass filtered signal through multiple decimation stages to a final sample rate below about 150 Hz.

Additionally illustratively, recovering the tag signal from the decimated signal comprises bandpass filtering the lowpass filtered signal.

Illustratively, bandpass filtering the lowpass filtered signal comprises bandpass filtering the lowpass filtered signal using a second bandpass filter with a bandwidth in the range of about 0.5 Hz to about 1.5 Hz, and a center frequency equal to the tag frequency to permit reliable detection of the tag frequency in the presence of noise.

Illustratively, recovering the tag signal frequency from the lowpass filtered signal comprises bandpass filtering the decimated signal.

Further illustratively, recovering the tag signal frequency from the detected amplitude of the lowpass filtered signal further comprises amplitude detecting the bandpass filtered decimated signal.

Additionally illustratively, amplitude detecting the bandpass filtered decimated signal comprises determining the absolute value of the bandpass filtered decimated signal and lowpass filtering the absolute value of the bandpass filtered decimated signal.

Further illustratively, the method comprises calibrating the amplitude detected signal.

Further illustratively, the method comprises displaying the magnitude of the leak.

According to an aspect of the disclosure, apparatus for detecting an approximately 3 Hz to approximately 35 Hz amplitude modulated, digital signal leaking from a CATV system comprises a digital leakage detector comprising a first bandpass filter having a center frequency within the CATV channel signal bandwidth, an RF amplifier coupled to the first bandpass filter, an analog-to-digital (A/D) converter coupled to the RF amplifier; and, a processing engine coupled to the A/D converter. The processing engine includes a source of mixing signals, a mixer for mixing the signals at an output port of the A/D converter with signals from the source of mixing signals, a lowpass filter coupled to the mixer, and a device for determining the magnitude of an output signal from the lowpass filter and recovering the tag signal.

Illustratively, the apparatus for detecting an approximately 3 Hz to approximately 35 Hz amplitude modulated, digital signal comprises an apparatus for detecting an approximately 3 Hz to approximately 35 Hz amplitude modulated, digital signal modulated to a depth in the range of > about 0 dB to ≤ about 5 dB.

Further illustratively, the first bandpass filter has a bandwidth in the range of about 5 MHz to about 15 MHz.

Additionally, the A/D converter has a sampling rate in the range of about 20 MHz to about 40 MHz.

Illustratively, the processing engine comprises at least one of a digital signal processor (DSP) and field-programmable gate array (FPGA).

Further illustratively, the mixer produces a complex mixing signal.

Illustratively, the lowpass filter comprises a lowpass filter having a cutoff frequency of about half the bandwidth of the amplitude modulated digital CATV channel signal.

Additionally illustratively, the device for determining the magnitude of the output signal from the lowpass filter comprises a device for summing the squares of the real part and the imaginary part of an output signal from the lowpass filter.

Additionally illustratively, the device comprises a device for decimating the magnitude of the lowpass filtered signal.

Illustratively, the device for decimating the lowpass filtered signal comprises a device for decimating the lowpass filtered signal through multiple decimation stages to a final sample rate below about 150 Hz.

Further illustratively, the device for determining the magnitude of an output signal from the lowpass filter comprises a second bandpass filter with a bandwidth in the range of about 0.5 Hz to about 1.5 Hz, and a center frequency equal to the tag frequency to permit reliable detection of the tag frequency in the presence of noise.

Further illustratively, the device for recovering the tag signal frequency from the lowpass filtered signal comprises a second bandpass filter for filtering the decimated signal.

Additionally illustratively, the device for recovering the tag signal frequency from the bandpass filtered signal comprises a device for amplitude detecting the bandpass filtered decimated signal.

Illustratively, the device for amplitude detecting the bandpass filtered decimated signal comprises a device for determining the absolute value of the bandpass filtered decimated signal and for lowpass filtering the absolute value of the bandpass filtered decimated signal.

Further illustratively, the device for recovering the tag signal frequency from the lowpass filtered signal comprises a device for calibrating the amplitude detected signal.

Further illustratively, the device for recovering the tag signal frequency from the lowpass filtered signal comprises a display for displaying the magnitude of the leak.

According to an aspect of the disclosure, a CATV system comprises a source of program material, a digital modulator for modulating the program material into a digital television signal, a channel modulator coupled to the digital modulator for modulating the digital television signal up to a CATV channel frequency, an amplitude modulator coupled to the channel modulator for amplitude modulating the CATV channel frequency signal, and a CATV plant coupled to the amplitude modulator for distributing the amplitude modulated CATV channel frequency signal.

Illustratively, the amplitude modulator modulates the cable channel frequency signal at a rate of between about 3 Hz and about 35 Hz.

Further illustratively, the amplitude modulator modulates the cable channel frequency signal at a rate of between about 10 Hz and about 23 Hz.

Illustratively, the amplitude modulator modulates the cable channel frequency signal to a depth of between about 0.5 dB and 5 dB.

Further illustratively, the amplitude modulator modulates the cable channel frequency signal to a depth of between about 1 dB and about 3 dB.

According to an aspect of the disclosure, a method of tagging a digital CATV channel for detection comprises providing a source of program material, digitally modulating the program material into a digital television signal, modulating the digital television signal up to a CATV channel frequency, amplitude modulating the CATV channel frequency signal, and coupling the amplitude modulated CATV channel frequency signal to a CATV plant for distribution.

Illustratively, amplitude modulating the CATV channel frequency signal comprises amplitude modulating the CATV channel frequency signal at a rate of between about 3 Hz and about 35 Hz.

Further illustratively, amplitude modulating the CATV channel frequency signal comprises amplitude modulating the CATV channel frequency signal at a rate of between about 10 Hz and about 23 Hz.

Illustratively, amplitude modulating the CATV channel frequency signal comprises amplitude modulating the CATV channel frequency signal to a depth of between about 0.5 dB and 5 dB.

Further illustratively, amplitude modulating the CATV channel frequency signal comprises amplitude modulating the CATV channel frequency signal to a depth of between about 1 dB and about 3 dB.

According to an aspect of the disclosure, a method for detecting egress of a digital CATV channel signal from a CATV system comprises amplitude modulating the digital CATV channel signal with a tag signal having a frequency in the range of about 3 Hz to about 35 Hz, coupling the amplitude modulated digital CATV channel signal to the CATV system, receiving the amplitude modulated digital CATV channel signal leaking from the CATV system, mixing the amplitude modulated digital CATV channel signal with a local oscillator signal to produce an intermediate frequency (IF) signal, filtering the IF signal to the approximate bandwidth of the digital CATV channel signal, reducing the bandpass filtered signal substantially to baseband, filtering the baseband signal to recover the tag signal, and producing an indication of recovery of the tag signal.

Illustratively, the method further comprises amplifying the received amplitude modulated digital CATV channel signal leaking from the CATV system prior to mixing the amplitude modulated digital CATV channel signal with the local oscillator signal.

Illustratively, reducing the output of the IF filter to baseband comprises amplitude modulation (AM) detecting the output of the IF filter.

Further illustratively, the method comprises amplifying the output of the IF filter before AM detecting the output of the IF filter.

Illustratively, filtering the baseband signal to recover the tag signal comprises filtering the baseband signal through a low pass filter.

Illustratively, filtering the baseband signal to recover the tag signal comprises filtering the low pass filtered baseband signal through a band pass filter to recover the tag signal.

Illustratively, filtering the baseband signal through a low pass filter comprises filtering the baseband signal through a low pass filter substantially to remove a portion of the baseband signal above the tag signal frequency.

Illustratively, filtering the baseband signal to recover the tag signal further comprises filtering the baseband signal with that portion of the baseband signal above the tag signal frequency removed through a band pass filter to recover the tag signal.

Illustratively, filtering the baseband signal to recover the tag signal comprises filtering the baseband signal substantially to remove that portion of the baseband signal above the tag signal frequency.

Illustratively, filtering the baseband signal to recover the tag signal comprises filtering the baseband signal through a band pass filter to recover the tag signal.

Illustratively, producing an indication of recovery of the tag signal comprises peak detecting the output signal from filter and displaying the level of the received tag signal.

According to an aspect of the disclosure, a leakage detector is provided for detecting egress of a digital CATV channel signal amplitude modulated with a tag signal having a frequency in the range of about 3 Hz to about 35 Hz and coupled to a CATV system. The leakage detector includes a local oscillator, a mixer coupled to the tag signal-modulated digital CATV channel signal and to the local oscillator for mixing the amplitude modulated digital CATV channel signal with the local oscillator signal to produce an intermediate frequency (IF) signal, a first band pass filter coupled to the mixer for reducing the IF signal substantially to baseband, a first low pass filter coupled to the first band pass filter for filtering the baseband signal to recover the tag signal, and a circuit coupled to the first low pass filter for producing an indication of recovery of the tag signal.

Further illustratively, the apparatus comprises an amplifier for amplifying the received tag signal-modulated digital CATV channel signal leaking from the CATV system. An output port of the amplifier is coupled to an input port of the mixer.

Further illustratively, the apparatus comprises an amplitude modulation (AM) detector coupled to the first band pass filter.

Further illustratively, the apparatus comprises an amplifier coupled to the first bandpass filter before the AM detector.

Further illustratively, the apparatus comprises a second low pass filter substantially to remove a portion of the baseband signal above the tag signal frequency.

Further illustratively, the apparatus comprises a second band pass filter coupled to the second low pass filter to recover the tag signal.

Alternatively illustratively, the apparatus comprises a second band pass filter coupled to the first band pass filter to recover the tag signal.

Illustratively, the circuit for producing an indication of recovery of the tag signal comprises a peak detecting and display circuit coupled to the first low pass filter.

BRIEF DESCRIPTIONS OF THE DRAWINGS

The disclosure may best be understood by referring to the following detailed description and accompanying drawings which illustrate the disclosure. In the drawings:

FIG. 5 illustrates diagrammatically an apparatus and method useful for generating certain signals according to the disclosure;

FIG. 6 illustrates diagrammatically portions of an apparatus according to the disclosure;

FIG. 7 illustrates diagrammatically apparatus and methods useful for detecting a low frequency tag pursuant to the disclosure; and, FIG. 8 illustrates diagrammatically portions of an apparatus according to the disclosure.

DETAILED DESCRIPTIONS OF ILLUSTRATIVE EMBODIMENTS

The following test was conducted to determine if a 256 quadrature amplitude modulated Annex B (hereinafter sometimes QAM) digital channel can be tagged for leakage detection without disrupting or otherwise affecting processing of the signal.

Figure 1:
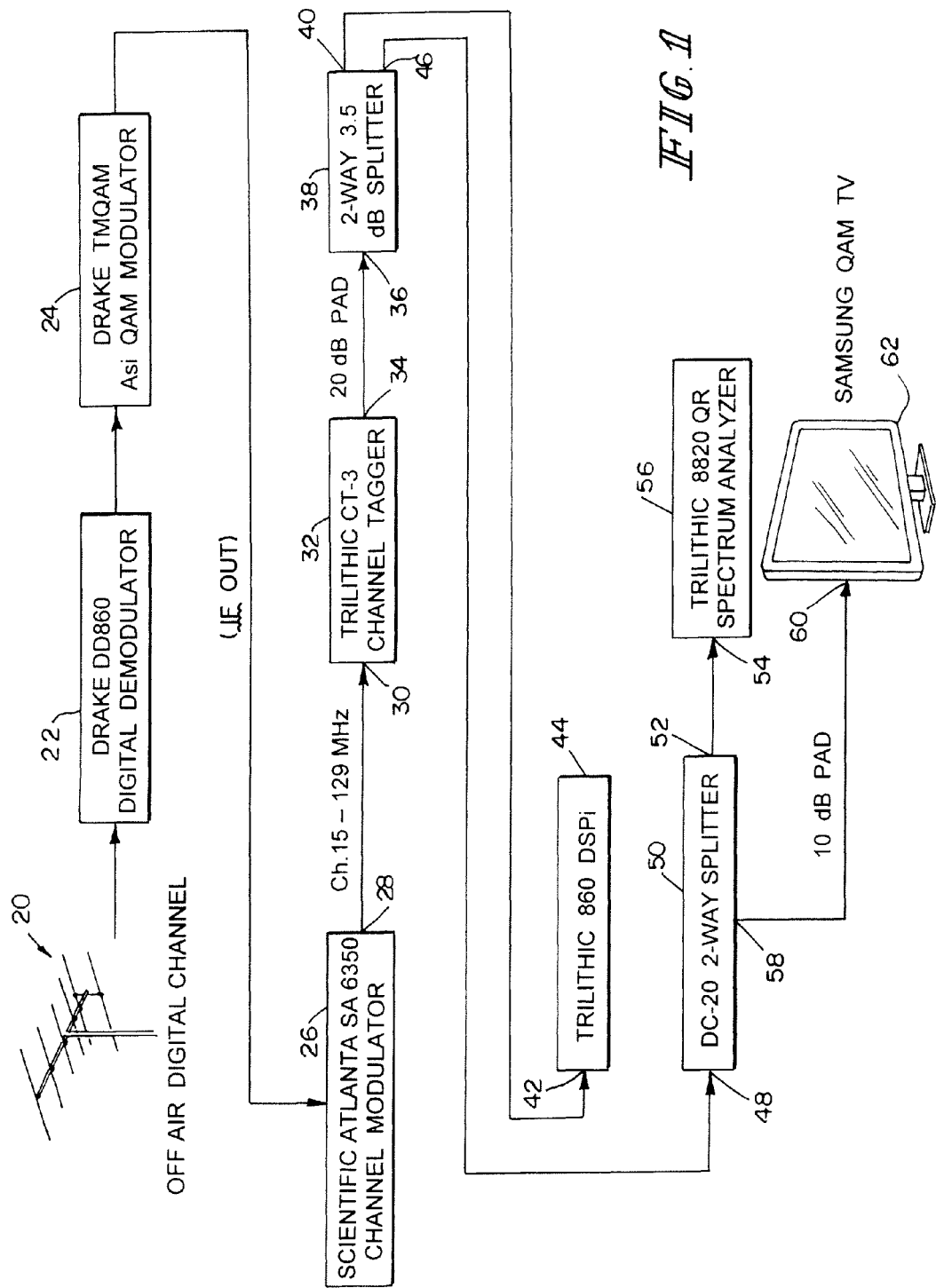
FIG. 1 illustrates diagrammatically a test apparatus and method useful in understanding the disclosure.

Referring particularly to FIG. 1, for the purposes of this test, a broadcast digital channel was received by an antenna 20, demodulated using a digital demodulator 22 such as, for example, a Drake model DD860 digital demodulator, re-modulated into a QAM signal using a digital modulator 24 such as, for example, a Drake TMQAM Asi QAM modulator, and then modulated up to NTSC channel 15 at 129 MHz center frequency using a channel modulator 26 such as, for example, a Scientific Atlanta model SA 6350 channel modulator.

The signal was coupled from an output port 28 of the modulator 26 to an input port 30 of a channel tagger instrument 32 of the type described in U.S. Pat. No. 5,608,428, a model CT-2 or CT-3 channel tagger instrument available from Trilithic, Inc, 9710 Park Davis Drive, Indianapolis, Ind. 46235. An output port 34 of the channel tagger instrument 32 was coupled through a 20 dB pad (not shown) to an input port 36 of a splitter 38. One output port 40 of the splitter 38 was coupled to an input port 42 of a testing instrument 44 of the general type described in published U.S. patent application 2002/0019983 A1, a model 860 DSPi testing instrument available from Trilithic, Inc. Another output port 46 of the splitter 38 was coupled to an input port 48 of a second splitter 50. A first output port 52 of splitter 50 was coupled to an input port 54 of a spectrum analyzer 56 such as, for example, a Trilithic model 8821 QR spectrum analyzer. Another output port 58 of splitter 50 was coupled through a 10 dB pad (not shown) to an input port 60 of a digital (QAM)-ready television receiver 62 such as, for example, a Samsung QAM TV.

Figure 2:
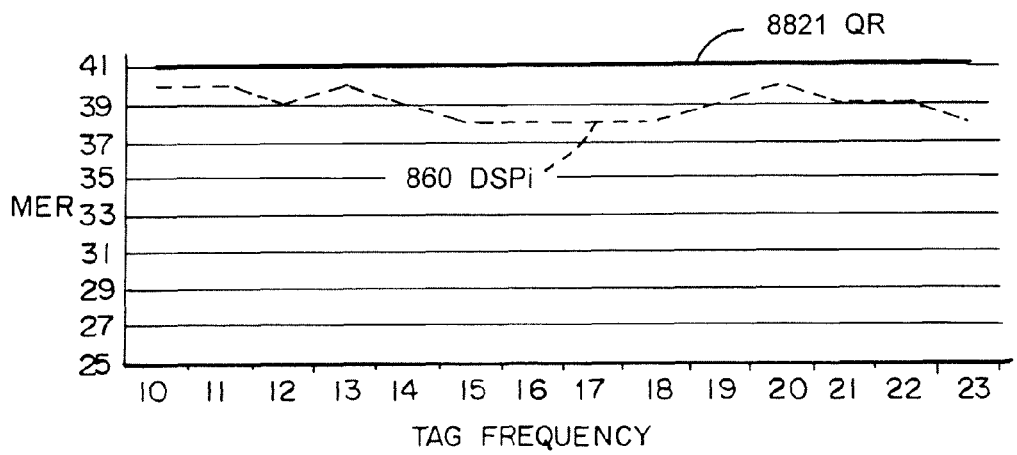
FIGS. 2-4 illustrate test results using different test parameters with the apparatus and methods illustrated in FIG. 1.
Figure 3:
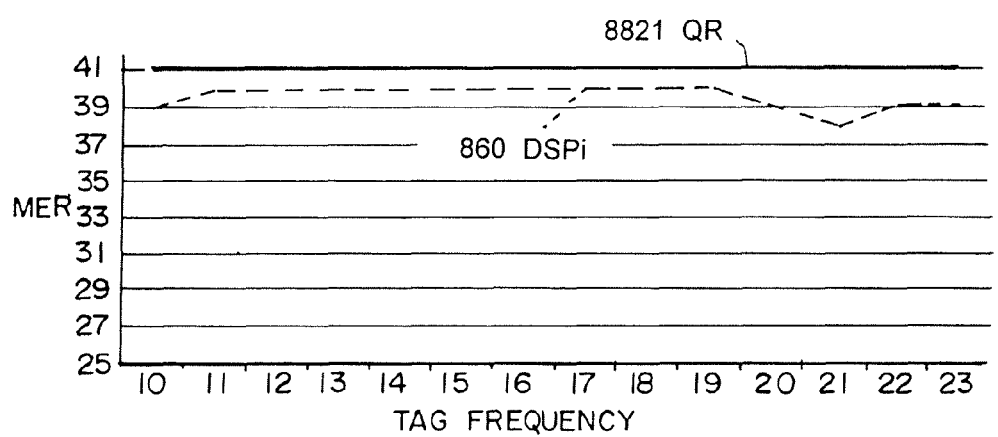
Figure 4:
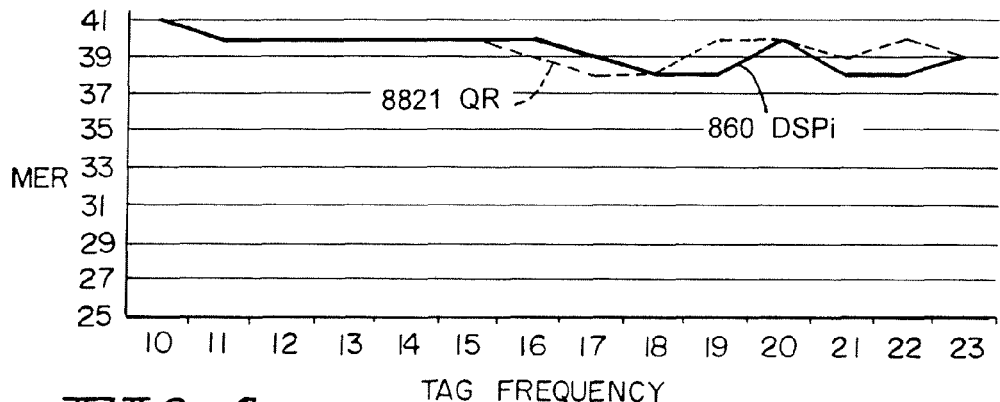

The modulation error ratio (hereinafter sometimes MER) and bit error rate (hereinafter sometimes BER) of the signal were measured by the testing instrument 44 and the spectrum analyzer 56 at each of the tag frequencies from 10 Hz to 23 Hz at three different depths (3 dB, 2 dB, 1 dB) of modulation. These results are tabulated in Tables I (3 dB depth of modulation), II (2 dB depth of modulation) and III (1 dB depth of modulation). The television receiver was monitored during the test for any signs of interference. The test setup is as illustrated in FIG. 1. FIGS. 2, 3 and 4 illustrate graphs of MER versus tag frequency for modulation depths of 3 dB, 2 dB and 1 dB, respectively.

The depths of modulation were verified using the spectrum analyzer 56. The tag frequency was verified using a GoldStar (now LG) Electronics model FC-2130 frequency counter. The level at the television receiver 62 was padded down to be roughly 1 dBmV using the not illustrated 10 dB pad between ports 58 and 60 on splitter 50 and receiver 62, respectively.

The results of the tests follow. The BER was observed and recorded, but no errors were noted at any time during the test using either the testing instrument 44 or the spectrum analyzer 56. Therefore the BER is not illustrated.

TABLE I 3 dB Depth of Modulation

| Tag Frequency | instrument 44 MER | analyzer 56 MER |
|---|---|---|
| 10 | 40 | 41 |
| 11 | 40 | 41 |
| 12 | 39 | 41 |
| 13 | 40 | 41 |
| 14 | 39 | 41 |
| 15 | 38 | 41 |
| 16 | 38 | 41 |
| 17 | 38 | 41 |
| 18 | 38 | 41 |
| 19 | 39 | 41 |
| 20 | 40 | 41 |
| 21 | 39 | 41 |
| 22 | 39 | 41 |
| 23 | 38 | 41 |

TABLE II 2 dB Depth of Modulation

| Tag Frequency | instrument 44 MER | analyzer 56 MER |
|---|---|---|
| 10 | 39 | 41 |
| 11 | 40 | 41 |
| 12 | 40 | 41 |
| 13 | 40 | 41 |
| 14 | 40 | 41 |
| 15 | 40 | 41 |
| 16 | 40 | 41 |
| 17 | 40 | 41 |
| 18 | 40 | 41 |
| 19 | 40 | 41 |
| 20 | 39 | 41 |
| 21 | 38 | 41 |
| 22 | 39 | 41 |
| 23 | 39 | 41 |

TABLE III 1 dB Depth of Modulation

| Tag Frequency | instrument 44 MER | analyzer 56 MER |
|---|---|---|
| 10 | 41 | 41 |
| 11 | 40 | 40 |
| 12 | 40 | 40 |
| 13 | 40 | 40 |
| 14 | 40 | 40 |
| 15 | 40 | 40 |
| 16 | 40 | 39 |
| 17 | 39 | 38 |
| 18 | 38 | 38 |
| 19 | 38 | 40 |
| 20 | 40 | 40 |
| 21 | 38 | 39 |
| 22 | 38 | 40 |
| 23 | 39 | 39 |

Additional observations noted while the above-described tests were being performed follow.

The signal levels would fluctuate slightly due to the channel tagger instrument 32. This was verified by turning the channel tagger instrument 32 off while testing.

The MER readings would fluctuate slightly due to the channel tagger instrument 32. Due to this, all recorded levels were rounded to the nearest single digit.

When observing the 256 QAM symbol constellation with the spectrum analyzer 56, the spectrum analyzer 56 would lose signal lock after a few seconds and would not regain signal lock. However, the testing instrument 44's symbol constellation display remained stable with the tagged signal.

Due to the unsettled symbol constellation issue with the spectrum analyzer 56, the readings were taken while the unit was in long term BER display mode. In this mode the spectrum analyzer 56 did not lose signal lock, and the readings were consistent and stable.

The television receiver 62 appeared to be unaffected by the tagged signal. The television receiver 62 only displayed momentary pixelation when the channel tagger instrument 32 was turned on and off.

From this testing, it was concluded that the channel tagger instrument 32 can successfully tag a digital channel, in this testing, a QAM channel, with little or no impact. The MER overall was roughly 1 to 2 dB lower than without the tag, but remained at acceptable levels. The BER readings consistently showed no errors. There appeared to be no difference in results regardless of what specific tag frequency was used. All tag frequencies in the 10 Hz-23 Hz range tested gave similar readings.

Turning now to FIGS. 5-7, a digital signal to be used in a leak detection scheme is first amplitude modulated with a 3 dB, 20 Hz tag, as illustrated in FIG. 5. This tagged, digital signal is coupled to the CATV (hereinafter sometimes cable) system 90, illustratively in the same manner as any other TV or cable modem signal, that is, by modulating it onto a CATV system carrier and coupling the thus-modulated carrier to the CATV system's downstream path. The above-described tests have established that the 3 dB 20 Hz tag does not interfere with subscribers' reception and demodulation of the thus-tagged digital signal. When the tagged, digital signal encounters, and is radiated through, a leak in the cable system 90, the low-amplitude leakage signal is broadcast into the air, and received by, for example, a leakage detector 92 of the general type described below.

FIG. 6 illustrates an embodiment of a digital leakage detector 92. First, the incoming signal from system 90 is band-limited using a bandpass filter 100 having a center frequency of, for example, 133 MHz, with a bandwidth of, for example, 10 MHz. The band-limited signal at the output port 102 of bandpass filter 100 is coupled to, and amplified by, an RF amplifier 104. The thus band-limited and amplified signal at the output port 106 of amplifier 104 is digitized by an A/D converter 108 with a sampling rate of, for example, 25 MHz. The digitized samples at the output port 110 of A/D converter 108 are coupled to a processing engine 112, such as a digital signal processor (hereinafter sometimes DSP) or field-programmable gate array (hereinafter sometimes FPGA), where further detection occurs.

FIG. 7 illustrates an example of a type of algorithm which may be used by the processing engine 112 to detect the 20 Hz tag on the received leaking tagged digital cable signal. First, the digitized samples are complex mixed down to baseband using an $e^{j2\pi F_c/F_s}$ source 114 and a mixer 116, where e is the base of the natural logarithms (~2.718), j=sqrt(−1), $F_C$ is the aliased center frequency of the bandpass filter 100, about 8 MHz in this example, and $F_S$ is the sampling rate of the A/D converter 108, about 25 megasamples/sec. in this example. Complex mixing is employed because it does not produce mixing images and, when used in conjunction with amplitude detection, is not sensitive to frequency errors. The complex signal at the output port 118 of mixer 116 is lowpass filtered by a filter 120 with a cutoff frequency of about half the bandwidth of the tagged signal of interest, about 3 MHz in the case of an ITU J.83 Annex B digital cable channel. The magnitude of the signal is computed 121 by summing the square of the real part and the square of the imaginary part of the complex signal.

The 20 Hz tag component next needs to be recovered from the signal at the output of 121. This can be accomplished several ways, but in this example algorithm is accomplished by a combination of lowpass filtering, via the illustrated lowpass filter in decimator 122, and decimation 122, to achieve a final sample rate of around 100 Hz. This decimation permits creation of a reasonable length bandpass filter 124 with a bandwidth of 1 Hz, and a center frequency equal to the tag frequency, in this example, 20 Hz, which is required to reliably detect the received leakage's 20 Hz tag in the presence of noise. Using a reasonable length for a decimation filter 122, the operation to decimate from the A/D converter 108's sample rate of 25 MHz to about 100 Hz can be accomplished in 5 steps, each one decimating the sampling rate by a factor of 12. After the bandpass filter 124, the signal is amplitude detected by taking the absolute value of the signal at 126 and then lowpass filtering at 128. The output of this stage is calibrated at 130 and the strength of the leak is displayed at 132 for the user.

Figure 8:
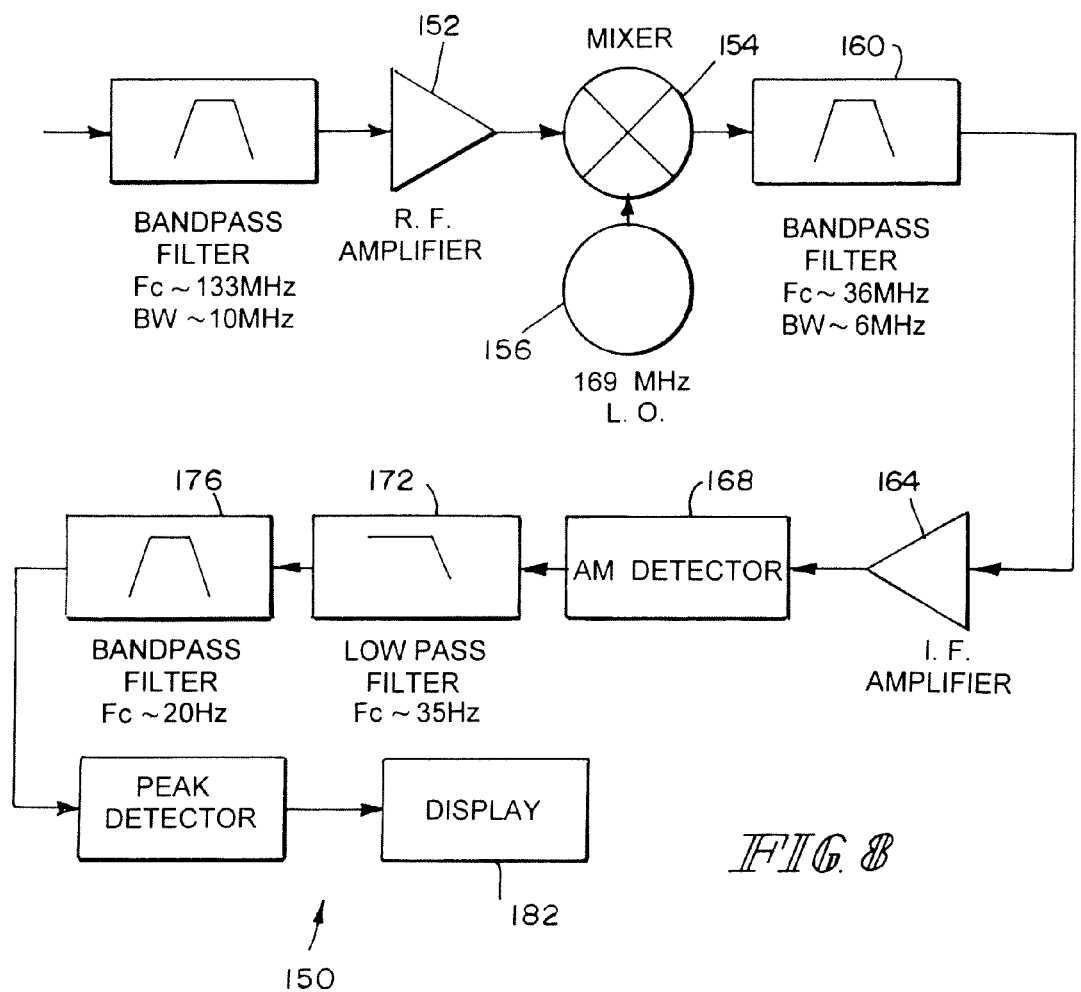

FIG. 8 illustrates another system for detecting the tag signal. In FIG. 8, the tagged digital cable channel signal is detected using a superheterodyne receiver 150. A 133 MHz single conversion receiver 150 is described. However, it should be understood that the input frequency may be any frequency used to carry a cable TV channel and that additional conversions and/or a combination of digital and analog receiving techniques are possible.

The received 133 MHz leakage signal is amplified 152 and supplied to a mixer 154 where it is mixed with a 169 MHz signal supplied by a local oscillator 156 to produce an intermediate frequency signal of 36 MHz. The 36 MHz IF signal is bandpass filtered 160 to select the approximate bandwidth of an ITU J.83 Annex B digital channel (~6 MHz). The output of the IF filter 160 is amplified 164 and coupled to an AM detector 168 which reduces the digital signal to baseband, providing a signal with the 20 Hz tag component. The detector 168 output is passed through a 35 Hz low pass filter 172 to remove most of the baseband signal above the tag frequency of 20 Hz. The signal is then coupled to a narrow band 20 Hz band pass filter 176 which may be, for example, a switched capacitor filter. The output signal from filter 176 is then peak detected and coupled to a display circuit 182 that scales and displays the level of the received 20 Hz tag signal.

What is claimed is:

1. An apparatus for detecting egress of a digital CATV channel signal amplitude modulated with a tag signal having a frequency in the range of 3 Hz to 35 Hz and coupled to a CATV system, the apparatus comprising a leakage detector for receiving the amplitude modulated digital CATV channel signal leaking from a CATV system, the leakage detector including:
   a first circuit for reducing the received amplitude modulated digital CATV channel signal leaking from the CATV system to baseband, the first circuit including
      a local oscillator for mixing a local oscillator signal with the received amplitude modulated digital CATV channel signal leaking from the CATV system to produce an intermediate frequency (IF) signal,
      a first bandpass filter for bandpass filtering the IF signal to select a bandwidth of the digital CATV channel signal, and
      an amplitude modulation (AM) detector for AM detecting the bandpass filtered IF signal to reduce the received amplitude modulated digital CATV channel signal leaking from the CATV system to baseband,
   a lowpass filter for lowpass filtering the digital CATV channel signal reduced to baseband,
   a second bandpass filter for recovering the tag signal, the second bandpass filter having a center frequency equal to the tag frequency and a bandwidth in the range of ≥0.5 Hz and ≤1.5 Hz coupled to the lowpass filter for bandpass filtering the lowpass filtered digital CATV channel signal reduced to baseband, and
   a second circuit for indicating recovery of the tag signal.

2. The apparatus of claim 1 including a complex mixing signal source for mixing with the received amplitude modulated digital CATV channel signal leaking from the CATV system for reducing the received amplitude modulated digital CATV channel signal leaking from the CATV system to baseband.

3. The apparatus of claim 1 wherein the second circuit for indicating recovery of the tag signal comprises a circuit for scaling or calibrating the lowpass filtered signal and a display for displaying the amplitude of the lowpass filtered signal.

* * * * *